UNITED STATES PATENT OFFICE.

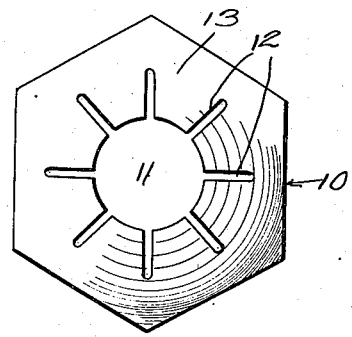
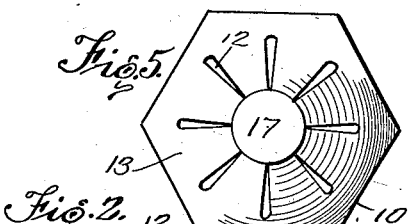
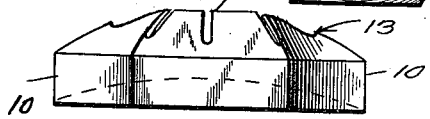
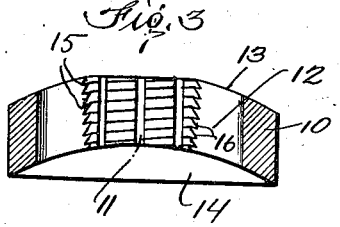
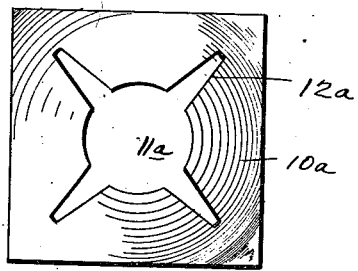
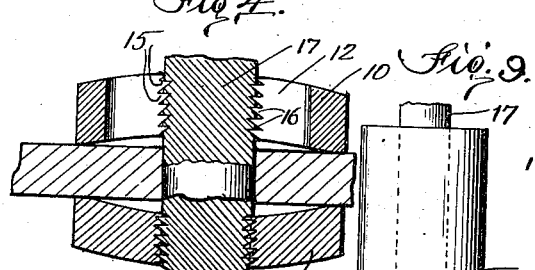
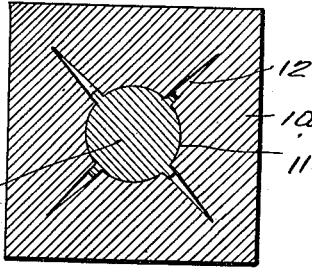
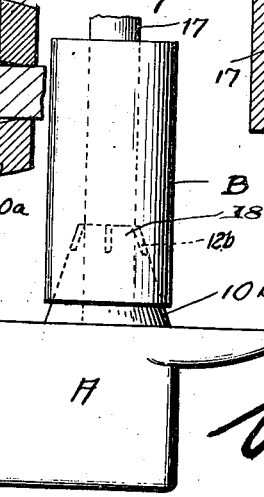
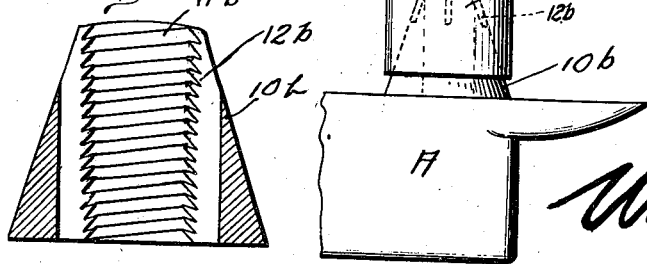

JOHN A. WHEELER, OF BLOOMINGTON, CALIFORNIA, ASSIGNOR OF ONE-TENTH TO EBER M. LASH, OF RIALTO, CALIFORNIA.

NUT.

1,421,638. Specification of Letters Patent. Patented July 4, 1922.

Application filed May 14, 1921. Serial No. 469,487.

*To all whom it may concern:*

Be it known that I, JOHN A. WHEELER, a citizen of the United States, residing at Bloomington, in the county of San Bernardino and State of California, have invented certain new and useful Improvements in Nuts, of which the following is a specification, reference being had to the accompanying drawings.

This invention relates to lock nuts, that is nuts which, when placed upon a bolt or equivalent member, will become locked thereon against accidental removal.

The general object of the invention is to provide a nut of such form that when it is applied to a rod or unthreaded bolt and forced into position against the work, it will be caused to tightly grip the bolt along the entire extent of the nut and lock thereon.

A further object is to provide a nut which is interiorly threaded but which is not required to operate upon a threaded bolt or rod but may be applied to a plain bolt or rod and will bite thereinto when in place so as to prevent the nut from being accidentally disengaged from the bolt, thus eliminating the necessity and expense of threading the stock for the bolts, permitting rods of all sorts to be used for the purpose and permitting the use of rods as bolt shanks which would otherwise be scrapped, this construction further permitting the nut to bite into the rod or bolt anywhere along the length of the rod or bolt and being such that the greater the strain, the tighter the nut will hold.

And a further object is to provide a nut of this character which does not have to be applied with a wrench but which is applied by hammering in place and which therefore may be put in place and tightened against the work very quickly.

Still another object is to so form the nut that it may be either permanently engaged with the shank of a bolt or rod so that it cannot be removed therefrom, or which by a slightly different construction will permit the nut to be removed from the rod by means of a wrench.

A further object is to provide a nut with a peculiar form of thread, as it may be termed, which will prevent any movement of the nut in one direction but which will permit the removal of the nut by the application of a wrench.

Another object is to form a nut of a cup or concavo-convex shape having interior ratchet teeth which nut, when flattened against the work by the blows of a hammer, will act to force the teeth firmly into the shank of an unthreaded bolt or rod, these teeth being so formed that the nut may be forced further against the work or tightened up whenever desired but cannot be forced outward by the work.

And another object is to provide a nut which may be permanently applied to a rod or bolt to form a head therefor.

Other objects will appear in the course of the following description.

My invention is illustrated in the accompanying drawings, wherein:—

Figure 1 is a top plan view of one form of nut constructed in accordance with my invention;

Figure 2 is a side elevation thereof;

Figure 3 is a cross section of the nut shown in Figure 1;

Figure 4 is a cross section of the nut shown in Figure 3 and the nut shown in Figure 7 in applied position;

Figure 5 is a plan view of the nut shown in Figure 3 after it is in place;

Figure 6 is a plan view of a slightly modified form of nut;

Figure 7 is a sectional view of this nut when applied;

Figure 8 is a fragmentary sectional view of a modified form of nut such as is used on plow bolts;

Figure 9 is a elevation showing the manner in which this nut is compressed upon the plow bolt.

It will be understood that all of these figures are exaggerated as to the size of the screw-threads and their depth.

Referring to these drawings, it is to be noted that I have illustrated in Figures 1 to 4 a nut which is removable from a shank. This nut may be of any shape in plan, square, hexagonal, octagonal, etc., and may have any desired shape in side elevation. The nut 10 is formed of any desired thickness and is annular in shape to provide a central aperture 11. From this central aperture extend a plurality of radial slots 12, these slots in the nut which is not to be permanently applied to the bolt or shank being of approximately even width throughout their length. The nut is concavo-convex in shape to provide a convex outer face 13 and a concave inner face 14, these faces having a greater curvature before the nut is applied than after the nut is put in place, as will be later explained.

As illustrated in Figure 3, the nut when it leaves the shop has its central opening 11 tapering in form toward the concave side 14 of the nut and this central aperture is screw-threaded, the teeth formed by the threads being like ratchet teeth, in other words having a series of parallel faces 15 approximately concentric to the concavo-convex faces of the nut and these parallel faces being conjoined by inclined faces 16 which extend outward and toward the concave face of the nut.

Now when a nut of the character illustrated in Figure 3 is applied to the shank, rod or bolt, designated 17, and is more or less flattened, the flattening operation which is performed by hammering the nut or otherwise exerting pressure upon its convex face causes the teeth formed by the screw-threads to be forced into and bite firmly upon the rod or shank 17, as illustrated in Figure 4. The slots 12 in this flattening or hammering operation tend to close at the end adjacent the bolt, as illustrated in Figure 5, so that practically a continuous biting surface is formed upon the screw-threaded face of the nut in engagement with the rod. In the use of the nut, the nut is forced downward against the work, assuming that there is a head formed upon the shank 17, and then the convex face of the nut is hammered, as by means of an ordinary hammer or by means of an air hammer or pressure is applied thereto in any desired way which will cause the flattening of the nut and the binding of the nut upon the rod. The ratchet shape of the teeth formed by the screw-thread is such that the nut cannot move outward on the rod or away from the work, particularly in view of the fact that the nut is still somewhat concavo-convex and any thrust exerted by the work therefore tends to still further flatten the nut and cause it to bind still more firmly upon the bolt or shank 17.

If it be desired to tighten the nut, the nut is still further hammered to cause it to move toward the work, which will be permitted by the shape of the ratchet teeth, but if it be desired to remove the nut, then a wrench is applied to the nut and the nut is turned in the usual manner and as it is turned it will act like a die cutting screw-threads on the rod until the nut has run off the rod or shank entirely.

Where the nut is to be applied permanently to the rod, as for instance where this nut is to form the head of a bolt, then the form of nut illustrated in Figure 6 is used, where the nut 10$^a$ is formed with a central aperture 11$^a$, but the slots 12$^a$ are not of uniform width but the slots are wider at the ends adjacent the bolt than they are at their outer ends. Under these circumstances, when the nut is driven upon the rod and flattened down, the slots 12$^a$ will not entirely close at their ends adjacent the nut, as is the case in the form of nut shown in Figure 1, but the slots are slightly open at the ends adjacent the nut and as a consequence the nut, when being driven upon the bolt, creates ridges on the bolt or shank and these ridges, extending into the mouths of the slots 12$^a$, act as a lock to the nut to prevent its rotation on the shank so that the nut is held from any longitudinal movement on the bolt by the binding action of the teeth of the nut and is held from any rotation by the ridges on the bolt which are forced into the inner ends of the slots 12$^a$. This is shown in Figure 7.

It will be obvious, therefore, that the form of nut 10$^a$ may be used to provide a head for a bolt or shank and to be permanently applied thereto, while the nut 10 is used as an ordinary nut coacting with this head to clamp a piece of work between them, or it is obvious that two permanent nuts may be put upon a rod to clamp the work between them, these nuts being such that they cannot be removed, or obviously two removable nuts may be used upon the rod.

It will be seen that when the nut is driven down in place, it still has a slightly concavo-convex shape and this slight cup shape given to the nut after it is driven gives to the nut a small amount of elasticity which is of value in two ways, first it allows the nut to secure a new or tighter hold, and second it holds the nut more firmly on a rod by forcing its teeth or threads more firmly into the rod where it has bitten into it. By making the threads of the nut very hard and tough, much harder than any rod upon which the nut is to be used, the threads will not strip as is the case with the common nut and bolt. The strain on this nut comes on the outside under edges, that is the outer margin of the concave face of the nut, instead of all over the faces of the nut. This causes the nut to bite inwardly or into the center of the rod.

It will be noted that my nut dispenses entirely with the necessity of using a threaded bolt, rod or shank, and also dispenses with the necessity of having a rod or shank formed with a head, as the permanent nut shown in Figure 6 may be placed upon the rod to form the head thereof. This allows the utilization of plain rod iron to form the bolt. Thus old scrap iron ordinarily thrown away may be utilized and saved and even strap iron may be used to form bolts by simply rounding the ends of the strap iron. Furthermore, my invention entirely eliminates the difficulty due to difference in thread gauges on bolts and nuts, as my improved nut requires no thread on the bolt of any gauge at all or of any kind.

It will be seen that the nuts illustrated may be readily made on a punching machine and that it requires no new tools to apply the nut. The nut may be made of relatively thin steel and thus may be made stronger, while at the same time using less metal than nuts now made. The nut may be tightened by hammering it into place and may be removed by the use of a wrench, but if the nut is to be used again it must first be laid upon an anvil over a hole of suitable size and upside down and by using a riveting hammer against the concave face, its cup shape may be increased to the degree it had initially. Obviously this invention may be applied to nuts of various sizes and to bolts of various sizes. Thus, for instance, for small bolts it is only necessary to cut pieces from a roll of wire to any length desired and place one of the permanent nuts 10$^a$ on the wire for a head and use one of the removable nuts on the wire in the way an ordinary nut is used. This permits those who are not provided with stocks and dies to readily form a bolt for any purpose desired, and it is obvious that a bolt of this character is much stronger than can now be bought, owing to the superior strength of the wire over the strength of the metal used in ordinary small bolts. The nut may be used over piping, as well as over solid rods, and be clamped down in the usual manner. It is reiterated that if the threads on the nut are sufficiently hard and tough, they will not batter or strip but will always bite deeper into the rod or bolt as the strain becomes greater on the nut and its threads.

In Figures 8 and 9 I show an application of my invention to a plow bolt. The nut 10$^b$ is of substantially the same character as before stated, except that it is circular in form and frusto-conical and is formed with a central aperture 11$^b$ and it has the radial slots 12$^b$. These radial slots intersect at their upper ends the outer surface of the nut so that the upper end is formed with what may be termed a plurality of more or less resilient tongues 18. Thus these tongues 18 may be contracted. The nut has ratchet threads of the same character as the ratchet threads heretofore described and, as illustrated in an exaggerated manner in Figure 8, the nut may be set in place on the bolt by slipping it over the bolt 17 in its expanded condition, resting it upon an anvil A, and forcing the tongues 18 inward by means of an annular tool B having a convex under face which will engage the nut. The ratchet teeth being forced firmly into the shank 17 will grip this shank and the nut will be held firmly in position on the bolt. If it be desired to remove the nut, it may be rotated by a wrench and will then cut screw-threads on the bolt, as previously stated, but there is no necessity of applying a wrench to put it in place, and after it has been put in place around the end of the shank 17, it may be contracted into firm engagement with the shank in the manner shown in Figure 9.

I claim:—

1. A nut concavo-convex in form, the central aperture of the nut being formed with a screw-thread, one of the faces of the thread throughout its length being approximately parallel to the outer face of the nut, the opposite face of the thread being outwardly inclined and toward the concave face of the nut.

2. A nut concavo-convex in form and having a central aperture, and radiating slots intersecting the aperture, the nut having an internal screw-thread, said screw-thread having one face thereof throughout its length disposed at right angles to the axis of the nut and the opposite face throughout its length disposed at an inclination to the axis of the nut and toward the concave face of the nut.

3. A nut concavo-convex in form and having a central aperture, said aperture expanding outward from the concave face of the nut, and the aperture having inwardly projecting teeth.

4. A nut concavo-convex in form and having a central aperture, said aperture expanding outward from the concave face of the nut, the wall of the aperture being interiorly screw-threaded, the screw-thread having one face at right angles to the axis of the nut and the opposite face inclined relative to the axis outward and toward the concave face of the nut whereby when said nut is put in position upon a bolt and flattened, the flattening of the nut will cause the teeth to bite into the bolt throughout their entire extent.

5. A nut of the character described concavo-convex in form and having a central aperture, and a plurality of slots radiating from the aperture, said slots being wider at the end nearest the aperture than at their outer ends, the wall of the aperture being screw-threaded and the aperture being tapering toward the concave face of the nut.

6. A nut of the character described concavo-convex in form and having a central aperture, and a plurality of slots radiating from the aperture, said slots being wider at the end nearest the aperture than at their outer ends, the wall of the aperture being screw-threaded and the aperture being tapering toward the concave face of the nut, the screw-thread of the aperture having its outer face at right angles to the axis of the nut and its inner face inclined to the axis of the nut and toward the concave face of the nut.

7. The combination with an unthreaded bolt, of a nut coacting therewith, said nut being concavo-convex in form and having a central bolt receiving aperture, and radiating slots intersecting the aperture, the wall of the aperture being formed with teeth whereby to cause the nut to bind upon the bolt when the nut is flattened, the central aperture of the nut being tapering toward the concave face of the nut.

8. A nut having a concave work-engaging face, a central aperture, and radiating slots intersecting the aperture, the wall of the aperture being formed with a screw-thread, the outer face of the thread being approximately at right angles to the axis of the nut, the inner face of the thread being inclined outward and toward the concave face of the nut.

9. A nut having a bore formed with ratchet teeth, the teeth having faces approximately at right angles to the axis of the nut and faces inclined outward toward one end of the nut, the nut being radially slotted at a plurality of points and being so formed that the portions between said slots may be forced inward to grip the bolt.

In testimony whereof I hereunto affix my signature.

JOHN A. WHEELER.